(12) United States Patent
Ishida

(10) Patent No.: US 6,195,570 B1
(45) Date of Patent: Feb. 27, 2001

(54) MOBILE TERMINAL PROVIDED WITH DISPLAY CONTROLLING FUNCTION BY DETECTING INSERTION OF EARPHONE JACK

(75) Inventor: Takayasu Ishida, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/161,509

(22) Filed: Sep. 28, 1998

(30) Foreign Application Priority Data

Sep. 30, 1997 (JP) .................................................... 9-265602

(51) Int. Cl.⁷ ...................................................... H04Q 7/32
(52) U.S. Cl. ........................ 455/566; 455/568; 455/569; 455/575; 455/90; 455/556; 455/557; 379/420; 379/433; 379/430; 379/431; 379/428
(58) Field of Search ..................................... 455/566, 568, 455/569, 550, 575, 90, 403, 425, 556, 557, 346, 347; 379/420, 433, 428, 430, 431

(56) References Cited

U.S. PATENT DOCUMENTS 5,335,276    8/1994    Thompson et al. .................. 455/566
5,475,872  * 12/1995   Sato ....................................... 455/90

FOREIGN PATENT DOCUMENTS 4-192850  *  7/1992  (JP) .
WO 98/23077    5/1998  (WO) .
WO 98/29959    7/1998  (WO) .

OTHER PUBLICATIONS

British Search Report dated Feb. 4, 1999.

* cited by examiner

*Primary Examiner*—Fan Tsang
*Assistant Examiner*—Keith Ferguson
(74) *Attorney, Agent, or Firm*—McGinn & Gibb, PLLC

(57) ABSTRACT

When a power source is turned on, a menu screen is displayed on LCD. When the insertion of an earphone jack is detected with the menu screen displayed, display on LCD is automatically switched from the menu screen to a dialing screen. A user can have conversation with a desired party by dialing using the displayed dialing screen. If the insertion of an earphone jack is detected while another processing is executed using the menu screen after the power source is turned on, the processing is temporarily interrupted and the dialing screen is displayed on LCD. The temporarily interrupted processing is executed again when a call is finished. Even during a call, another processing can be executed using the menu screen.

32 Claims, 16 Drawing Sheets

| | | |
|---|---|---|
| CHIKARA AOKI | YAMADORI CONFECTIONERY | 00-1234-1234 |
| HIDEHARU ABE | OTAFUKU INDUSTRY | 012-987-9999 |
| SHIGEHISA IKEDA | TATEHAMA RAILROAD CORPORATION | 012-999-9888 |
| ■ RYOSUKE UEDA | HANDA STEEL | 00-2222-6543 |
| YUMI ENDO | KANDA FOOD INDUSTRY | 00-5555-2020 |
| YUKO OTA | <NO INPUT> | 00-23-1111 |
| TOMOHISA OKADA | SANO TRAINING SCHOOL | 00-88-1212 |
| EIJI KABUYAMA | NOBEYAMA PRINTING OFFICE | 01-777-999 |
| MASAKO KANDA | TSURUKAME CONFECTIONERY | 00-333-666 |
| MAICHI KINOSHITA | HANDA STEEL | 12345 |
| SYUZOU MOKUZEN | NANBU AMUSEMENT PART | 012-222-2222 |
| MEIKO UMEDA | MIBUTOOL SHOP | 012-333-3333 |
| HARUHIKO KUBOTA | MANKYU DEPARTMENT STORE | 012-444-4444 |
| TAKESHI KENJYO | RAFFIT DISTILLERY | 000-555-5555 |

Fig. 7

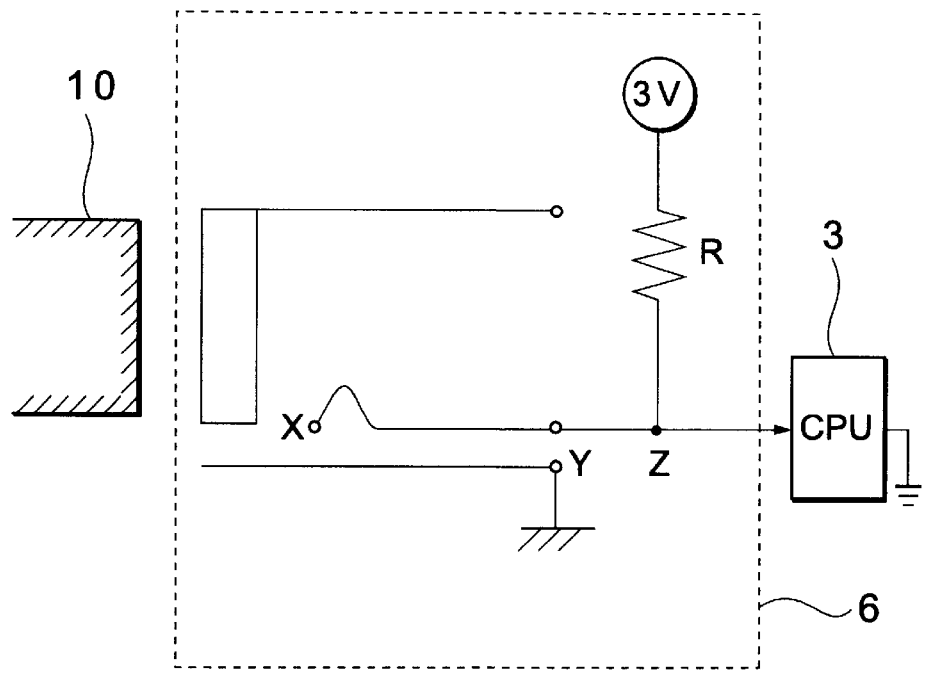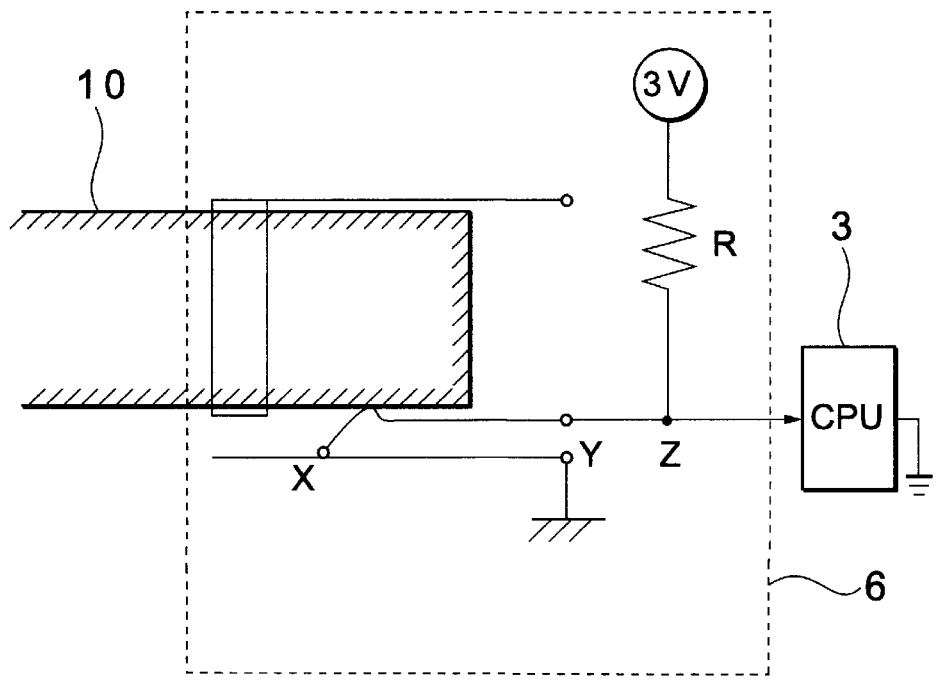

MOBILE TERMINAL PROVIDED WITH DISPLAY CONTROLLING FUNCTION BY DETECTING INSERTION OF EARPHONE JACK

BACKGROUND OF THE INVENTION

1. Field of the Invention

The present invention relates to a mobile terminal provided with a radio telephone function.

2. Description of the Related Art

Recently, a mobile terminal provided with a communication function such as a telephone and data communication, and so on, is widely popular. For a general mobile terminal provided with a telephone function, to solve a problem of large size caused by providing dial keys with which a normal telephone set is provided, a touch-panel is adopted. Therefore, if a user uses a telephone function, a dial screen is displayed on a liquid-crystal display (LCD) when the user presses a predetermined switch. The user can make a call and others by pressing each touch tone dial on the displayed dial screen.

However, for such a mobile terminal, if such a mobile terminal is put in a bag or a pocket with a dial screen displayed on LCD, there is a problem that a key is pressed by mistake and a call is made.

In a radio telephone disclosed in Japanese laid-open patent application heisei4-192850, calling operation is limited based upon whether an earphone jack is inserted or not. Therefore, in such a radio telephone, if the mobile telephone is put in a bag or a pocket, a call is prevented from being made when a user detaches an earphone jack from the mobile terminal even if a key is pressed by mistake.

However, such a radio telephone has a problem that operability is deteriorated because predetermined key operation is required to make a call after the insertion of the earphone jack.

SUMMARY OF THE INVENTION

The object of the present invention is to provide a mobile terminal obtained by further improving a conventional type mobile terminal.

Another object of the present invention is to provide a mobile terminal in which operability is enhanced by automatically displaying a dialing screen if an earphone jack is inserted into the mobile terminal.

Further another object of the present invention is to provide a mobile terminal the flexibility of which is enhanced by enabling even a user who does not know a method of operating the mobile terminal at all to readily use the mobile terminal as a telephone set.

Furthermore another object of the present invention is to provide a mobile terminal in which operation for users to communicate can be promptly executed by automatically displaying a dialing screen if a protective cover is opened with an earphone jack inserted into the mobile terminal.

The other object of the present invention is to provide a mobile terminal in which a call is automatically finished if an earphone jack is pulled out of the mobile terminal and a user can do the next processing promptly by making a menu screen display.

To achieve the above objects, a mobile terminal according to the present invention is provided with display means for displaying a menu screen, detection means for detecting the insertion of an earphone jack and control means for switching said menu screen to a dialing screen for executing a telephone function based upon the output of said detection means. The mobile terminal according to the present invention is also provided with communication means for enabling communication using a telephone function. The display means displays a dialing screen. The control means controls the above display means so that the above menu screen is switched to the above dialing screen if the insertion of an earphone jack is detected. It is desirable that the dialing screen is a ten key screen or an address book screen. The mobile terminal according to the present invention is also provided with selection means for selecting either the ten key screen or the address book screen. The mobile terminal according to the present invention is further provided with judgment means for judging whether the mobile terminal exists inside a receivable area or not and the display means displays a predetermined warning message if the insertion of an earphone jack is detected when it is judged that the mobile terminal does not exist inside a receivable area. The mobile terminal according to the present invention is also provided with comparison means for comparing the voltage value of a cell for driving the mobile terminal with a predetermined value and the display means displays a predetermined warning message if the insertion of an earphone jack is detected when the voltage value of the cell is smaller than a predetermined value. The mobile terminal according to the present invention is also provided with operation means for operating so that functions except the above telephone function are executed. The mobile terminal according to the present invention is also provided with interruption means for interrupting the execution of a function except the telephone function if the insertion of an earphone jack is detected when the function except the telephone function is executed. The mobile terminal according to the present invention is also provided with resumption means for resuming the execution of the function interrupted by the interruption means after a call is finished. The mobile terminal according to the present invention is provided with judgment means for judging whether an earphone jack is pulled out or not during a call and ring-off processing means for executing the ring-off processing of the call based upon the output of the above judgment means. The control means controls the display means based upon the output of the judgment means. The mobile terminal according to the present invention is further provided with judgment means for judging whether a protective cover for protecting the display means is open or not. The control means controls the display means based upon the output of the detection means and the judgment means. The display means displays a dialing screen if a protective cover is opened with an earphone jack inserted. The mobile terminal according to the present invention is also provided with judgment means for judging whether the mobile terminal exists in a receivable area or not if an earphone jack is inserted with a protective cover closed. The display means displays a predetermined warning message if it is judged by the above judgment means that the mobile terminal does not exist in a receivable area. The mobile terminal according to the present invention is also provided with judgment means for judging whether an earphone jack is pulled out during a call or not. The mobile terminal according to the present invention is also provided with ring-off processing means for executing the ring-off processing of the call based upon the output of the above judgment means. The control means controls the display means based upon the output of the above judgment means.

Also, the mobile terminal according to the present invention is provided with LCD for displaying a menu screen, earphone jack insertion detecting means for detecting the insertion of an earphone jack and CPU for switching menu screen to a dialing screen for executing a telephone function based upon the output of earphone jack insertion detecting means. The mobile terminal according to the present invention is also provided with a protective cover opening/closing detecting section for judging whether a protective cover for protecting the LCD is open or not.

A display control method of the mobile terminal according to the present invention is provided with a step for turning on a power source, a step for displaying a menu screen, a step for detecting the insertion of an earphone jack and a step for switching the above menu screen to a dialing screen for executing a telephone function based upon detection in the detection step. The display control method is also provided with a step for judging whether the mobile terminal exists inside a receivable area or not, a step for displaying information showing whether the mobile terminal exists inside a receivable area or not and a step for displaying a predetermined warning message if an earphone jack is inserted when the mobile terminal exists outside the receivable area. The display control method is also provided with a step for comparing the voltage value of a cell built in the mobile terminal with a predetermined value and a step for displaying a predetermined warning message if the voltage value of the cell is smaller than the predetermined value. The display control method is also provided with a step for inputting a dial and a step for having conversation. The display control method is also provided with a step for operating so that another function different from the telephone function is executed, a step for executing the function based upon the above operation and a step for interrupting the execution of the function if an earphone jack is inserted while the function based upon the operation is executed. The display control method is also provided with a step for resuming the interrupted execution of the function when a call is finished. The display control method is also provided with a step for judging whether a protective cover is open or not and a step for displaying a dialing screen when the protective cover is opened if an earphone jack is inserted with the protective cover closed. The display control method is also provided with a step for judging whether the mobile terminal exists in a receivable area or not and a step for displaying a predetermined warning message when the mobile terminal does not exist in a receivable area and a protective cover is opened. The display control method is also provided with a step for detecting the extraction of an earphone jack and a step for switching a dialing screen to a menu screen based upon detection in the above extraction detecting step. The display control method is also provided with a step for detecting the extraction of an earphone jack and a step for terminating a call based upon the detection in the extraction detecting step.

Therefore, according to the present invention, predetermined operation for switching a menu screen to a dialing screen is not required because the dialing screen is automatically displayed by inserting an earphone jack into a mobile terminal and operability can be enhanced.

Also, according to the present invention, flexibility can be enhanced because even a user who does not know a method of operating a mobile terminal at all can use it as a telephone set only by inserting an earphone jack into the mobile terminal.

Also, according to the present invention, a user can promptly perform operation for making a call because a dialing screen is automatically displayed when a protective cover is opened with an earphone jack inserted into a mobile terminal.

Further, according to the present invention, a user is not required to perform any operation for displaying a menu screen after a call is terminated and can promptly perform the next processing because a call is automatically terminated and a menu screen is displayed if an earphone jack is extracted from a mobile terminal.

BRIEF DESCRIPTION OF THE DRAWINGS

These and other objects, features and advantages of the invention will become more fully apparent from the following detailed description taken in conjunction with accompanying drawings.

FIG. 7 shows a displayed example of a suitable example of an address book screen displayed on LCD 8 shown in FIG. 1;

FIGS. 9a and 9b respectively show the circuitry configuration of a suitable example of an earphone jack insertion detecting section 6 shown in FIG. 1;

DETAILED DESCRIPTION OF THE PREFERRED EMBODIMENTS

Figure 1:
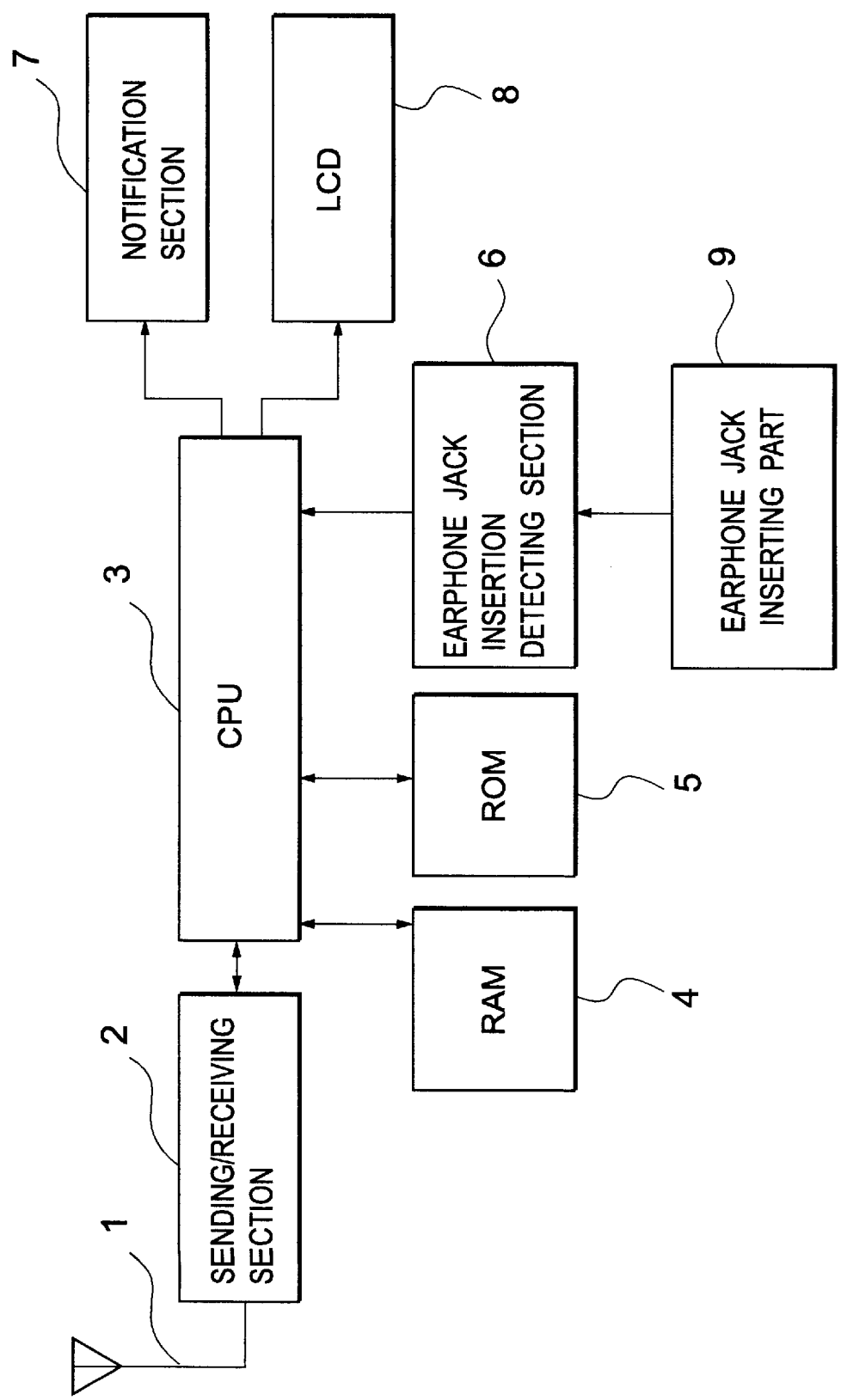
FIG. 1 shows the configuration of a suitable example of a mobile terminal according to the present invention.

Referring to FIG. 1, the configuration of a suitable example of a mobile terminal according to the present invention will be described below.

Figure 2:
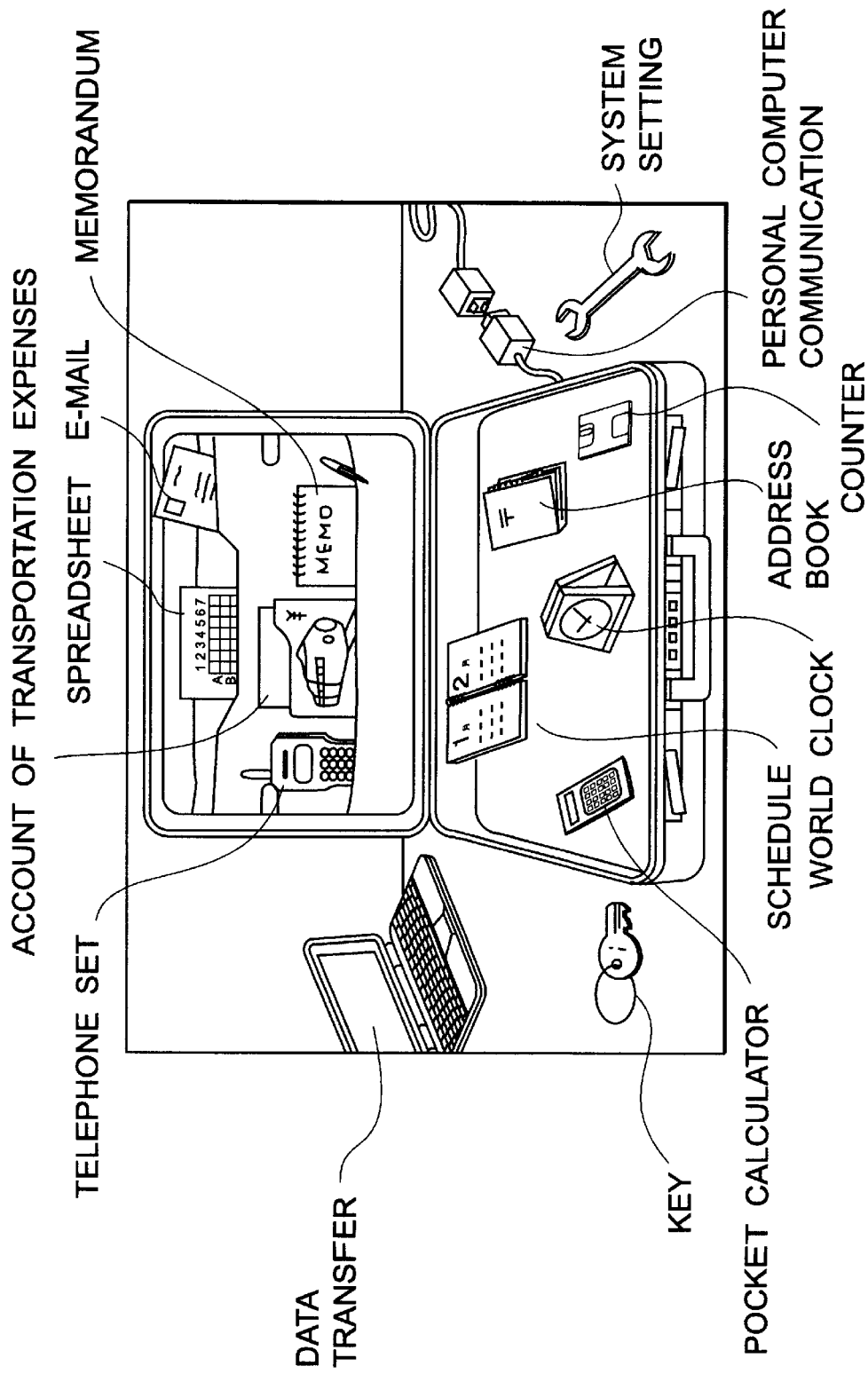
FIG. 2 shows a displayed example of a suitable example of a menu screen displayed on LCD 8 shown in FIG. 1.
Figure 3:
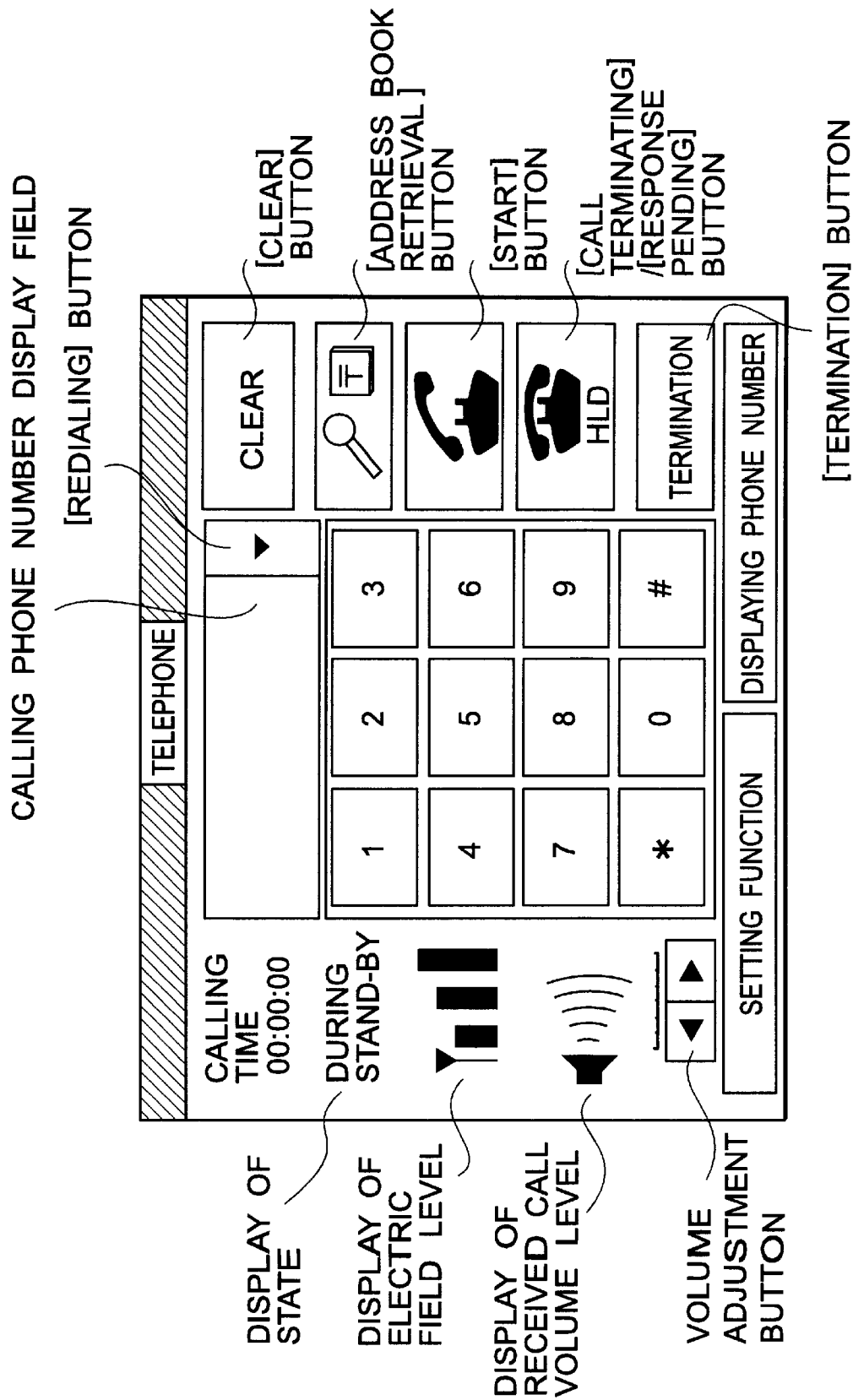
FIG. 3 shows a displayed example of a suitable example of a ten key screen displayed on LCD 8 shown in FIG. 1.

As shown in FIG. 1, a sending/receiving section 2 receives a radio signal from a base station not shown via an antenna 1, while it sends a radio signal to a base station not shown via the antenna 1 under the control of CPU 3. RAM 4 stores screen information displayed on LCD 8. ROM 5 stores various programs for controlling the mobile terminal. An earphone jack insertion detecting section 6 detects whether an earphone jack 10 is inserted into an earphone jack inserting part 9 or not. A Notification section 7 outputs a notification sound if a radio signal is received by the sending/receiving section 2 under the control of CPU 3. LCD 8 displays screen information stored in RAM 4 under the control of CPU 3. CPU 3 controls the screen information displayed on LCD 8 when the insertion of an earphone jack is detected by the earphone jack insertion detecting section 6. A menu screen shown in FIG. 2 is normally displayed on LCD 8 when a power source is turned on. When a user selects one of plural application programs displayed on the menu screen, for example, touches the icon, the selected application program is initialized. If a user touches a telephone icon, a ten key screen shown in FIG. 3 is displayed and the user can use it as a mobile telephone.

Figure 4:
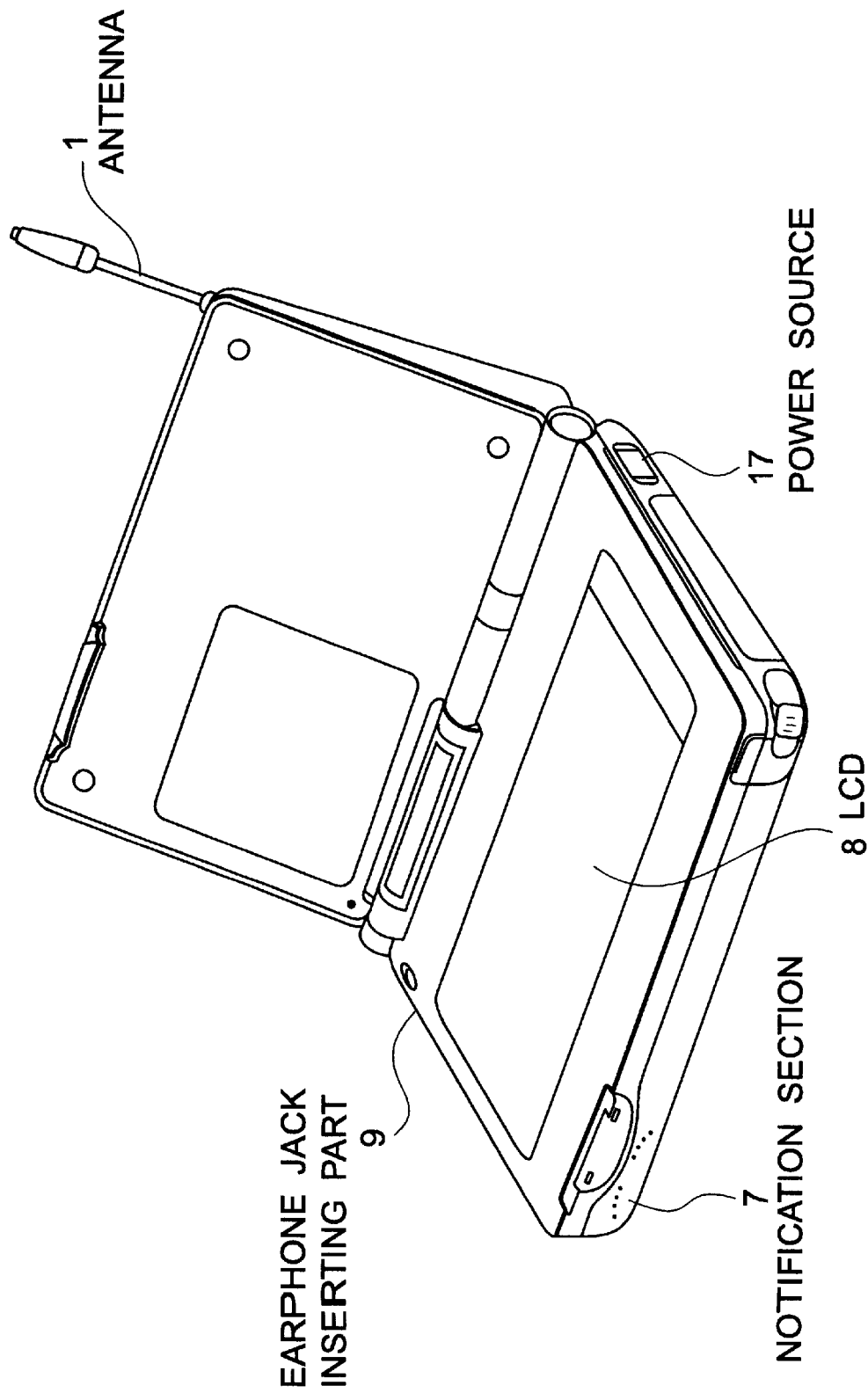
FIG. 4 is a suitable outside drawing showing the mobile terminal shown in FIG. 1.

FIG. 4 is a suitable outside drawing showing the mobile terminal shown in FIG. 1.

As shown in FIG. 4, the earphone jack inserting part 9 is provided to the side of the body of the mobile terminal. The notification section 7 is not limited to a speaker and may be also a light emitting diode (LED) or a vibrator. A power source 17 is provided to the side of the mobile terminal. A user can turn on the power source by operating a power switch.

Figure 5:
FIG. 5 shows a state when the mobile terminal shown in FIG. 4 is used.

FIG. 5 shows a state when the mobile terminal shown in FIG. 4 is used.

As shown in FIG. 5, if the mobile terminal is used as a telephone set, a user can catch the voice of the other party by inserting one end of the earphone jack 10 into the earphone jack inserting part 9 of the body of the mobile terminal and putting the other end of the earphone jack 10 in either ear of the user.

Next, referring to FIGS. 6a to 6c, the operation of a suitable example of the mobile terminal shown in FIG. 1 will be described in detail.

Figure 6A:
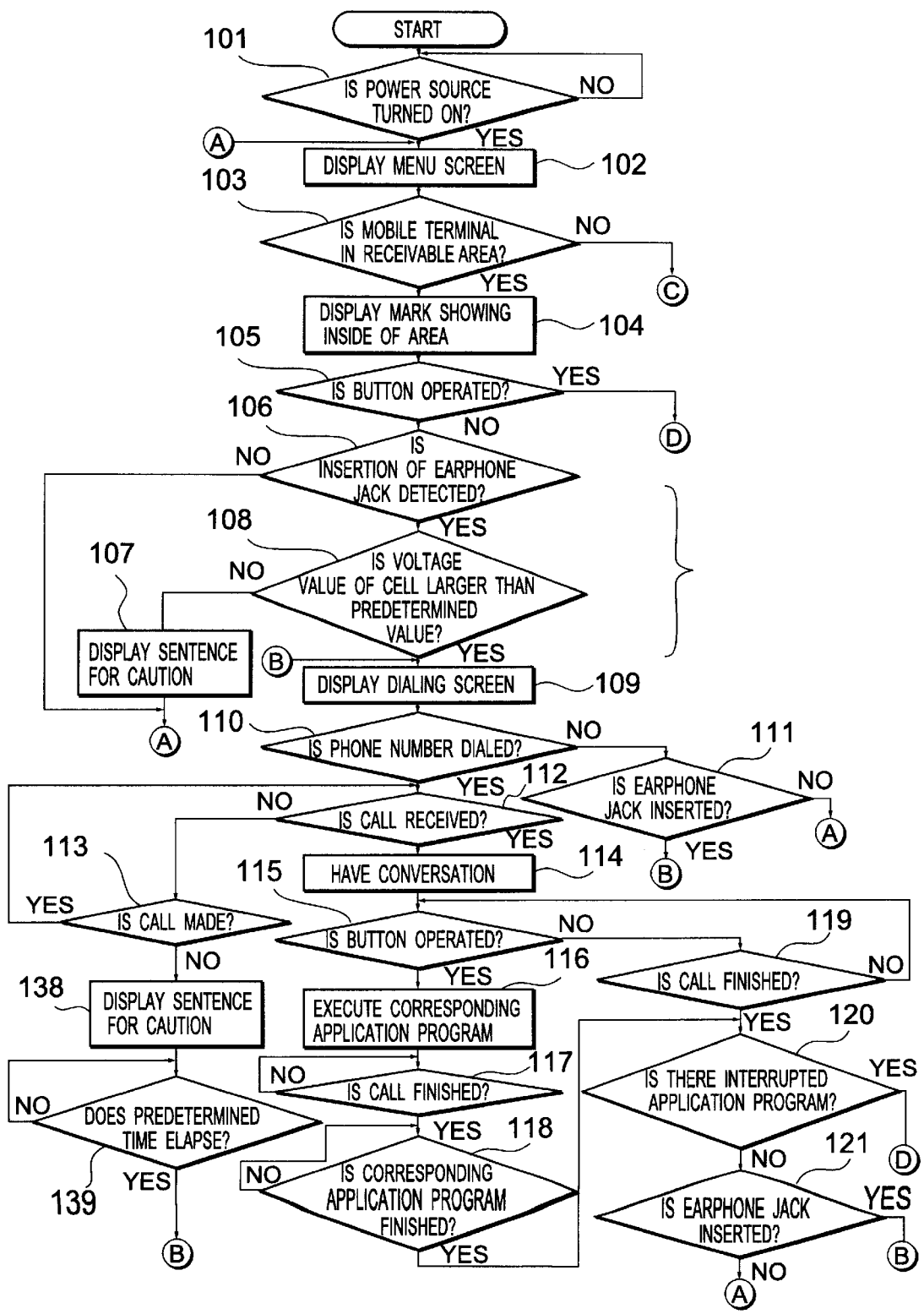
FIGS. 6a to 6c are flowcharts for explaining the operation of a suitable example of the mobile terminal shown in FIG. 1.

As shown in FIG. 6a, when the power source is turned on (YES in a step 101), a menu screen is displayed on LCD 8 in a step 102. Afterward, it is judged in a step 103 whether the mobile terminal exists in a receivable area or not.

Figure 6B:
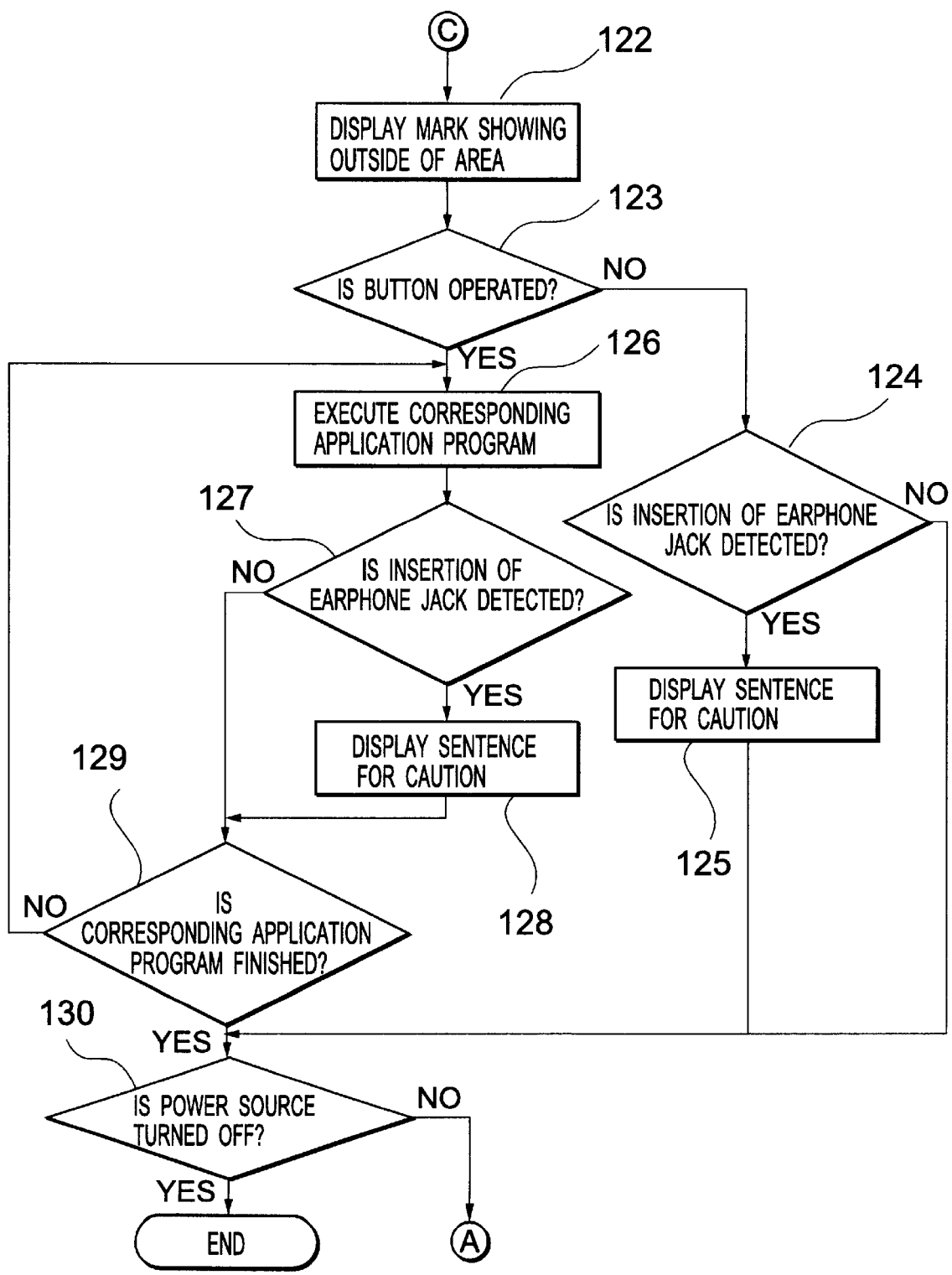

If it is judged that the mobile terminal does not exist in the receivable area, that is, if it is judged that the mobile terminal exists outside the receivable area (NO in the step 103), a mark for showing that the mobile terminal exists outside the receivable area is displayed on LCD 8 as shown in FIG. 6b in a step 122. Afterward, it is judged in a step 123 whether a user operates to select an application program on the menu screen or not, for example touches an icon or not. If the user does not operate to select an application program on the menu screen (NO in the step 123), it is judged in a step 124 whether the earphone jack 10 is inserted into the earphone jack inserting part 9 or not. If the earphone jack 10 is inserted into the earphone jack inserting part 9 (YES in the step 124), a sentence for caution, for example "You cannot receive call outside area" is displayed on LCD 8 in a step 125. Afterward, it is judged in a step 130 whether the power source is turned off or not and if the power source is not turned off (NO in the step 130), the display on LCD 8 is switched from the sentence for caution to a menu screen in the step 102.

On the other hand, if a user operates to select an application program on the menu screen (YES in the step 123), the selected application program is initialized on LCD 8 and is executed in a step 126. It is judged in a step 127 whether the earphone jack 10 is inserted into the earphone jack inserting part 9 or not. If the earphone jack 10 is inserted into the earphone jack inserting part 9 (YES in the step 127), the sentence for caution, for example "You cannot receive call outside area" is displayed on LCD 8 in a step 128. Afterward, it is judged in a step 129 whether the execution of the selected application program is finished or not and if the execution of the selected application program is not finished (NO in the step 129), the execution of the selected application program is continued in the step 126. If the execution of the selected application program is finished (YES in the step 129), the screen of the selected application program is deleted and it is judged in a step 130 whether the power source is turned off or not. If the power source is not turned off (NO in the step 130), a menu screen is displayed on the step 102.

If it is judged (YES in the step 103 shown in FIG. 6a) that the mobile terminal exists in a receivable area, a mark showing that the mobile terminal exists in the receivable area is displayed on LCD 8 in a step 104. It is judged in a step 105 whether a user operates to select an application program on the menu screen or not, for example touches an icon or not.

Figure 6C:
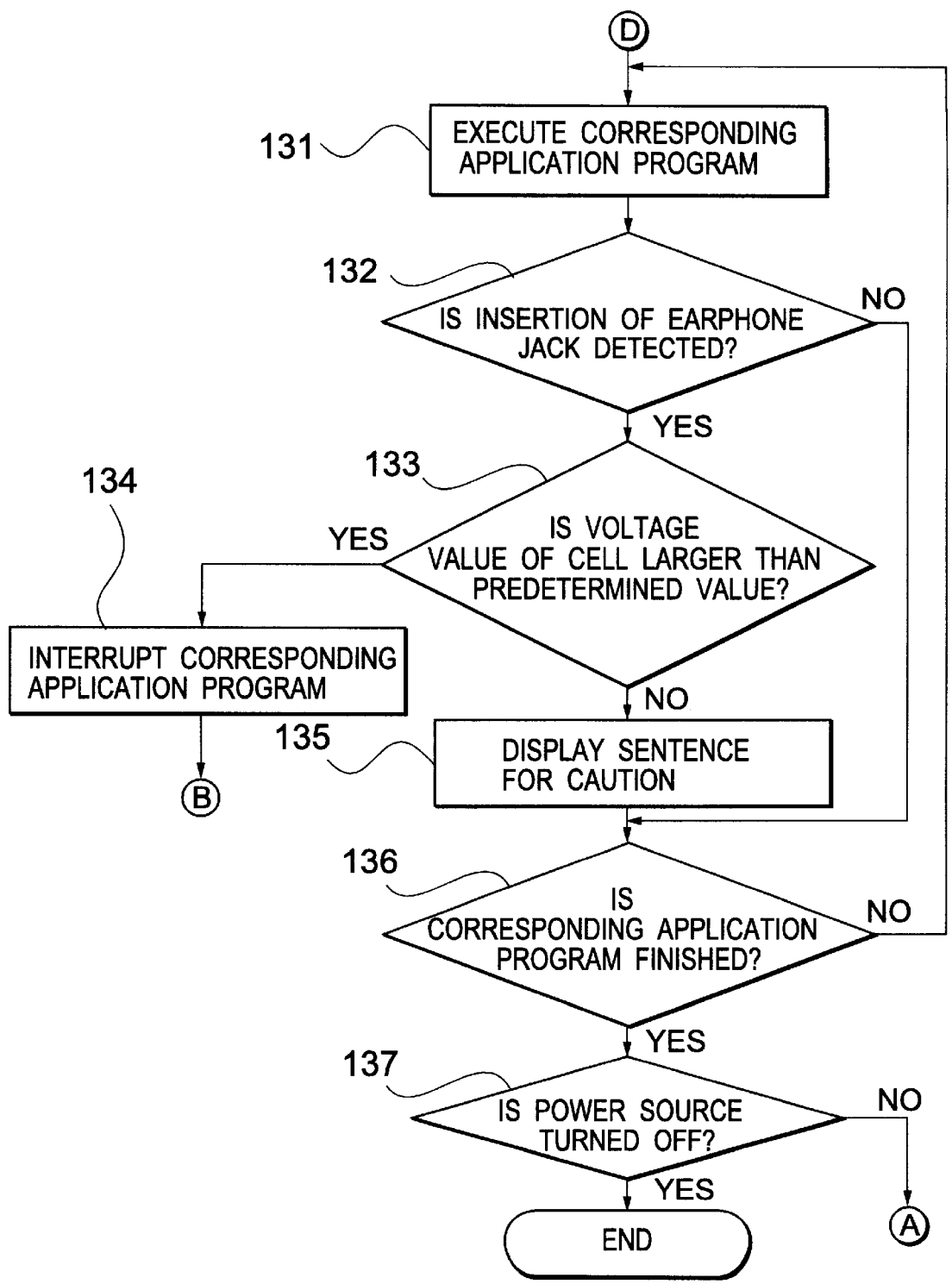

If the user operates to select the application program on the menu screen (YES in the step 105), the selected application program is initialized on LCD 8 as shown in FIG. 6c and is executed based upon the operation of the user in a step 131. It is judged in a step 132 whether the earphone jack 10 is inserted into the earphone jack inserting part 9 or not. If the earphone jack 10 is not inserted into the earphone jack inserting part 9 (NO in the step 132), it is judged in a step 136 whether the execution of the selected application program is finished or not and if the execution of the selected application program is not finished (NO in the step 136), it is continued in the step 131. If the execution of the selected application program is finished (YES in the step 136), it is judged in a step 137 whether the power source is turned off or not and if the power source is not turned off (NO in the step 137), the display on LCD 8 is switched from the sentence for caution to a menu screen in the step 102.

If it is judged (YES in the step 132) that the earphone jack 10 is inserted into the earphone jack inserting part 9, it is judged in a step 133 whether the voltage value of a cell built in the mobile terminal and not shown is higher than a predetermined value or not. The above predetermined value shows the lowest voltage value at which a telephone function can be used and if a lithium ion cell is built, the predetermined value is preset to 3.6 V for example. If it is judged (NO in the step 133) that the voltage value of the cell is a predetermined value or lower, a sentence for caution, for example "Charge" is displayed on LCD 8 in a step 135. Afterward, it is judged in a step 136 whether the execution of the selected application program is finished or not and it is judged in a step 137 whether the power source is turned off or not.

If it is judged (YES in the step 133) that the voltage value of the cell is larger than the predetermined value, the application program being executed is interrupted in a step 134 and the ten key screen shown in FIG. 3 is displayed on LCD 8 in a step 109.

If a user does not operate to select an application program on a menu screen (NO in the step 105 shown in FIG. 6a), it is judged in a step 106 whether the earphone jack 10 is inserted into the earphone jack inserting part 9 or not. If the earphone jack 10 is not inserted into the earphone jack inserting part 9 (NO in the step 106), the menu screen is continued to be displayed in the step 102.

If the earphone jack 10 is inserted into the earphone jack inserting part 9, it is judged in a step 108 whether the voltage value of a cell built in the mobile terminal and not shown is higher than a predetermined value or not. The above predetermined value is the same as the predetermined value described in the step 133 in FIG. 6c. If it is judged (NO in the step 108) that the voltage value of the cell is a predetermined value or lower, the sentence for caution, for example "Charge" is displayed on LCD 8 in a step 107. Afterward, when predetermined time elapses, a menu screen is displayed on LCD 8 again in the step 102.

If it is judged (YES in the step 108) that the voltage value of the cell is larger than a predetermined value, a ten key screen stored in RAM 4 is displayed on LCD 8 in the step 109. Screen information stored in RAM 4 is not limited to the ten key screen. A method of storing screen information in RAM 4 will be described in detail later.

Next, it is judged in a step 110 whether a user dials on the ten key screen displayed on LCD 8 or not, for example whether a user touches a desired number or not. If the user does not dial (NO in the step 110), it is judged in a step 111 whether the earphone jack 10 is inserted or not. If the earphone jack 10 is not inserted (NO in the step 111), a menu screen is displayed on LCD 8 again in the step 102. If the earphone jack 10 is inserted (YES in the step 111), the ten key screen is displayed as it is in the step 109.

If a user dials (YES in the step 110), it is judged in a step 112 whether a call to the other party corresponding to the dialed number is received or not. If the call is not received (NO in the step 112), it is judged in a step 113 whether the call is made or not. If it is judged (NO in the step 113) that no call is made, it is judged that the call was not received and a sentence for caution, for example "Your call cannot be received" is displayed on LCD 8 in a step 138. Afterward, when a predetermined time elapses (YES in a step 139), a ten key screen is displayed on LCD 8 again in the step 109. On the other hand, if a call is received (YES in the step 112), the user and the other party have conversation in a step 114. During a call, it is judged in a step 115 whether a user switches a screen displayed on LCD 8 from the dialing screen to a menu screen and operates to select an application program on the menu screen or not, for example touches an icon or not. If the user does not operate to select an application program on the menu screen (NO in the step 115), it is judged in a step 119 whether the call is finished or not.

On the other hand, if the user operates to select an application program on the menu screen (YES in the step 115), the selected application program is initialized on LCD 8 and is executed based upon the operation by the user in a step 116. It is judged in a step 117 whether the call is finished or not and it is judged in a step 118 whether the execution of the selected application program is finished or not. If the call is finished (YES in the step 117) and the execution of the selected application program is finished (YES in the step 118) or if the call is finished without a user operating to select an application program on a menu screen during the call (YES in the step 119), it is judged in a step 120 whether there is an application program interrupted before the call or not as described in the step 134 shown in FIG. 6c. If there is the interrupted application program (YES in the step 120), each processing shown in FIG. 6c is executed.

If there is no application program interrupted before the call (NO in the step 120), it is judged in a step 121 whether the earphone jack 10 is inserted into the earphone jack inserting part 9 or not. If the earphone jack 10 is inserted (YES in the step 121), processing after the step 109 is executed again. If the earphone jack 10 is not inserted (NO in the step 121), processing after the step 102 is executed again.

For a dialing screen, an address book screen shown in FIG. 7 is also conceivable in addition to the ten key screen shown in FIG. 3.

As shown in FIG. 7, the name of the other party registered by a user beforehand, the name and the phone number of a company to which the other party belongs are displayed on the address book screen. When a user selects the other party to be called on the address book screen, the ten key screen shown in FIG. 3 is displayed on LCD 8 and connection to the other party selected is automatically started. A call is terminated by a user pressing a call terminating button on the ten key screen.

A user can set a screen displayed when the earphone jack 10 is inserted. For example, a user can preset which of the ten key screen and the address book screen is to be displayed on LCD 8.

Figure 8:
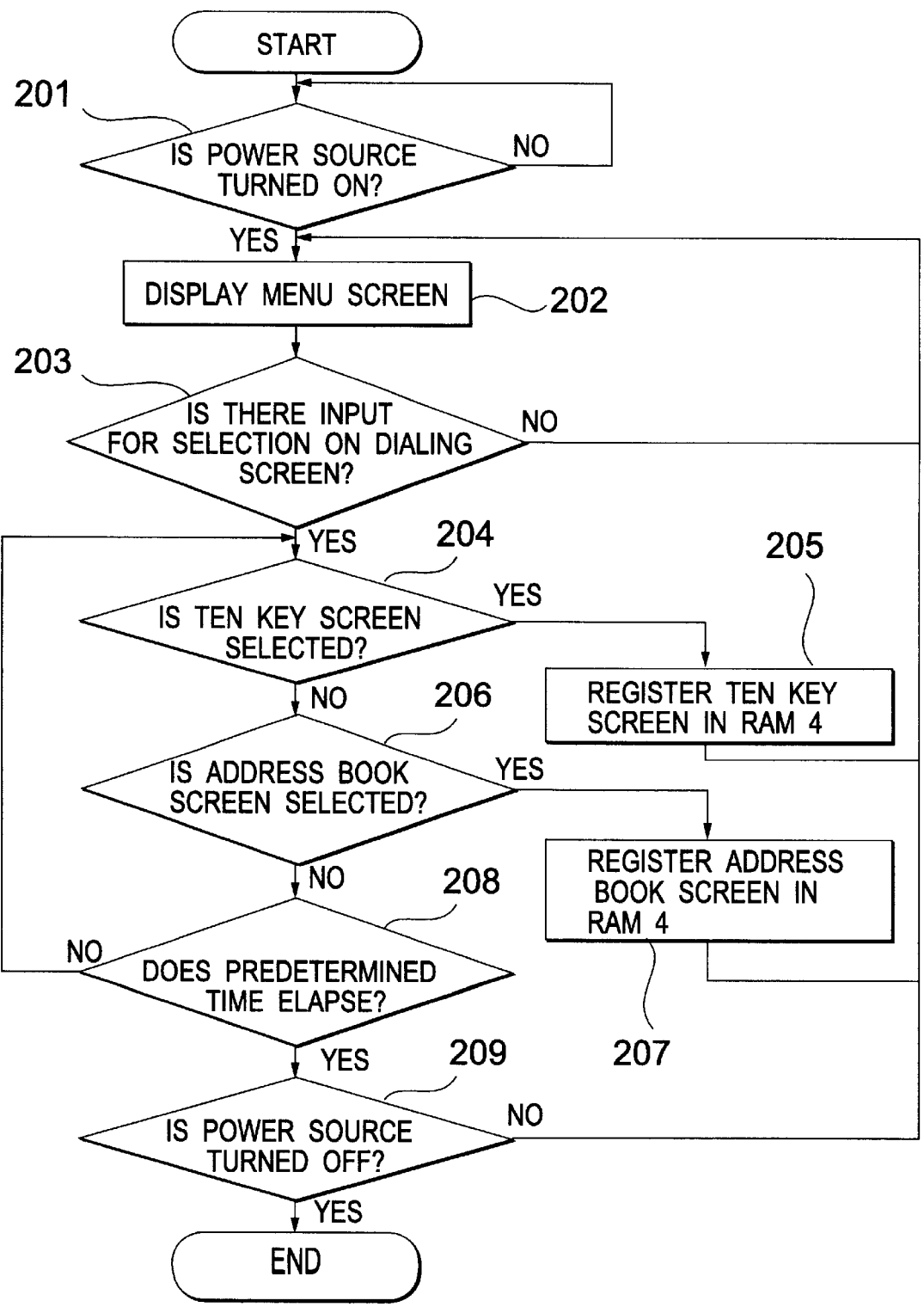
FIG. 8 is a flowchart for explaining a method of setting an initial screen displayed on LCD 8 shown in FIG. 1.

FIG. 8 is a flowchart showing the details of a method of initializing a screen automatically displayed if the earphone jack 10 is inserted.

As shown in FIG. 8, when the power source is turned on (YES in a step 201), a menu screen is displayed on LCD 8 in a step 202. It is judged in a step 203 whether a user operates to select a dialing screen on the menu screen with the menu screen displayed or not. If the user does not operate to select the dialing screen on the menu screen (NO in the step 203), the menu screen is displayed as it is in the step 202.

If the user operates to select the dialing screen on the menu screen (YES in the step 203), it is judged in steps 204 and 206 which of a ten key screen and an address book screen is selected. If the ten key screen is selected, it is registered in RAM 4 in a step 205 and if the address book screen is selected, it is registered in RAM 4 in a step 207. When the screen is registered in RAM 4, a menu screen is displayed on LCD 8 again in the step 202. If neither the ten key screen nor the address book screen is selected, it is judged in a step 208 whether predetermined time, for example ten seconds elapse or not. When no screen is selected and predetermined time elapses, it is judged in a step 209 whether the power source is turned off or not and if the power source is not turned off (NO in the step 209), a menu screen is displayed again in the step 202.

Next, referring to FIGS. 9a and 9b, the configuration of a suitable example of the earphone jack insertion detecting section 6 shown in FIG. 1 will be described. FIG. 9a shows a state in which the earphone jack 10 is not inserted into the earphone jack inserting part 9 and FIG. 9b shows a state in which the earphone jack 10 is inserted into the earphone jack inserting part 9.

As shown in FIG. 9a, as a terminal X does not come in contact with a terminal Y in a state in which the earphone jack 10 is not inserted, the voltage of the control section, for example 3 V, that is, a voltage value at a high level is output to CPU 3.

Figure 10C:
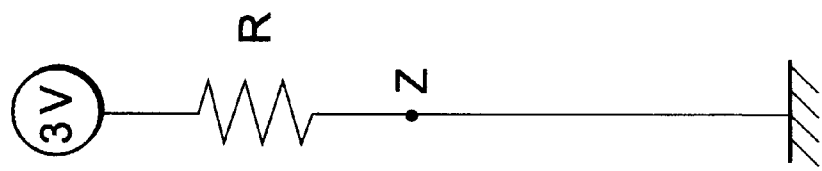
FIGS. 10a to 10c respectively show the equivalent circuit of each earphone jack insertion detecting circuit shown in FIGS. 9a and 9b.
Figure 10B:
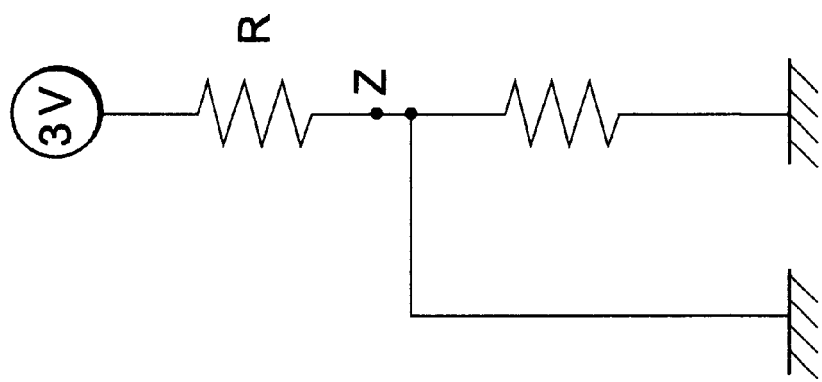
Figure 10A:
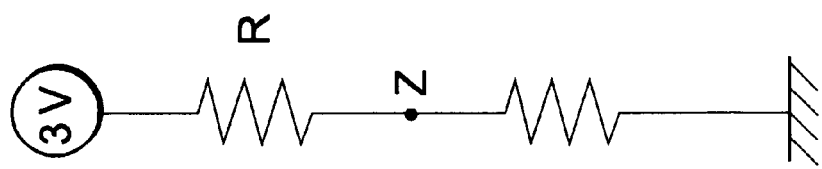

FIG. 10a shows an equivalent circuit of the earphone jack insertion detecting section 6 if the earphone jack 10 is not inserted.

As shown in FIG. 10a, as input impedance at the input terminal of CPU is high, voltage at a point Z is acquired based upon the ratio of the input impedance to a resistor R. However, as current hardly flows if input impedance is high, $\Delta V \approx 0$ because $I \approx 0$ based upon an expression $\Delta V = I\,R$ showing voltage drop at the resistor R. Therefore, the voltage at the point Z is 3 V.

On the other hand, as the terminal X is pressed by the earphone jack and comes in contact with the terminal Y in a state in which the earphone jack 10 is inserted as shown in FIG. 9b, a voltage value at a ground level, that is, at a low level is output to CPU 3.

FIGS. 10b and 10c respectively show an equivalent circuit of the earphone jack insertion detecting section 6 if the earphone jack 10 is inserted.

As shown in FIG. 10b, as a smaller value of parallel resistance is dominant, an equivalent circuit shown in FIG. 10c is obtained. As voltage drop is finished at the point Z, voltage at the point Z is at a ground level.

Therefore, CPU 3 can judge whether the earphone jack 10 is inserted into the earphone jack inserting part 9 or not depending upon that a voltage value output from the earphone jack insertion detecting section 6 is at a high level or at a low level.

Next, referring to FIG. 11, the circuitry configuration of a mobile terminal equivalent to another embodiment of the present invention will be described.

Figure 11:
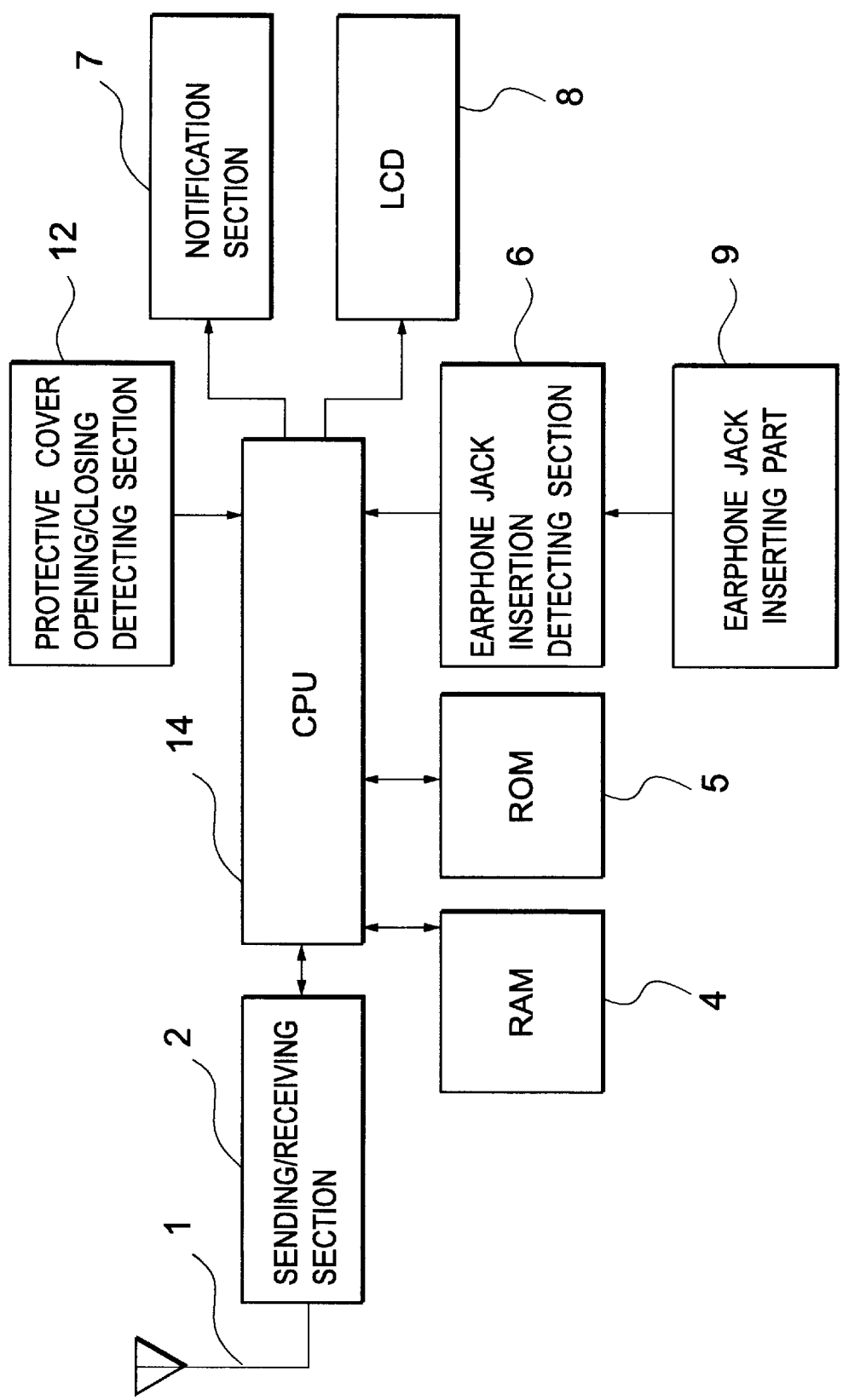
FIG. 11 shows the configuration of a suitable example of a mobile terminal equivalent to another embodiment of the present invention.

As shown in FIG. 11, the same reference number is allocated to the same component as in the mobile terminal shown in FIG. 1. The mobile terminal in this embodiment is newly provided with a protective cover opening/closing detecting section 12 in addition to the mobile terminal shown in FIG. 1 and provided with CPU 14 in place of CPU 3. The protective cover opening/closing detecting section 12 detects that a protective cover 13 provided to protect LCD 8 is open or closed for the body of the mobile terminal. CPU 14 controls a screen displayed on LCD 8 based upon the output of the earphone jack insertion detecting section 6 and the output of the protective cover opening/closing detecting section 12.

Figure 12:
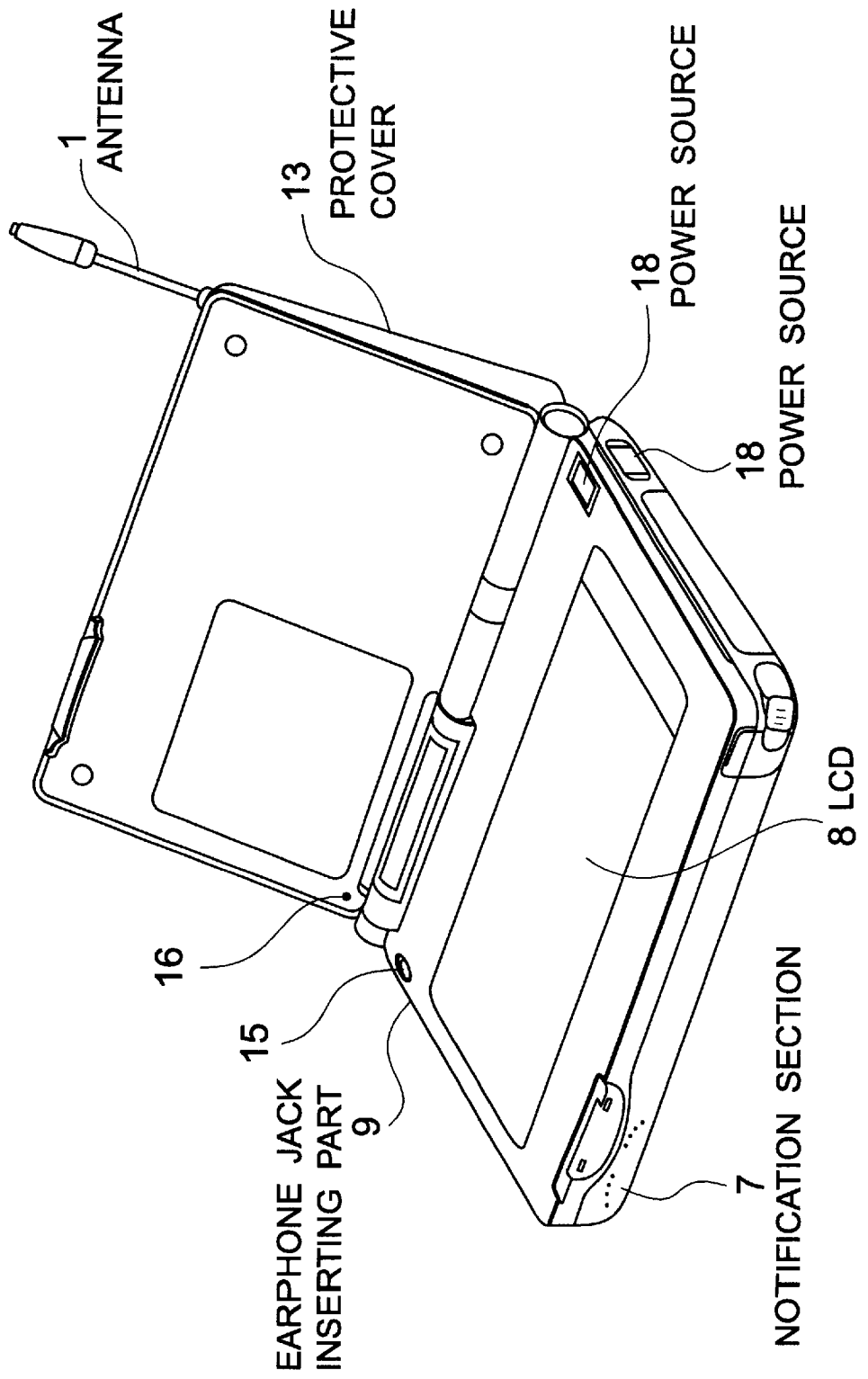
FIG. 12 is a suitable outside drawing showing the mobile terminal shown in FIG. 11.

FIG. 12 is a suitable outside drawing showing the mobile terminal shown in FIG. 11.

As shown in FIG. 12, LCD 8 is protected by closing the protective cover 13.

The protective cover opening/closing detecting section 12 is composed of a switch 15 and a convex portion 16 for example. In this case, when the protective cover 13 is closed, the switch 15 is turned on by the convex portion 16. Therefore, CPU 14 can judge whether the protective cover 13 is closed or not based upon whether the switch 15 is turned on or not. At this time, the switch 15 and the convex portion 16 are required to be respectively provided in positions corresponding when the protective cover 13 is closed.

The protective cover opening/closing detecting section 12 may be also composed of a light receiving part 15 and a luminance level detecting part built in the mobile terminal and not shown. The luminance level detecting part detects a luminance level in the light receiving part 15. The luminance level detected by the luminance level detecting part is compared with a predetermined level. It is judged whether the protective cover 13 is closed or not based upon whether a luminance level detected by the luminance level detecting part is higher than a predetermined level or not.

The constitution of the protective cover opening/closing detecting section 12 is not limited to the constitution of the switch 15 and the convex portion 16, and the constitution of the light receiving part 15 and the luminance level detecting part not shown.

A power switch 18 is provided not only to the side of the mobile terminal but at the same level as LCD 8. As shown in FIG. 4, the power switch 18 may be also provided only to the side of the mobile terminal. Therefore, a user can turn on a power source by operating the power switch 18 when the protective cover 13 is open or when the protective cover is closed.

Next, referring to FIG. 13, the operation of a suitable example of the mobile terminal shown in FIG. 11 will be described in detail.

Figure 13:
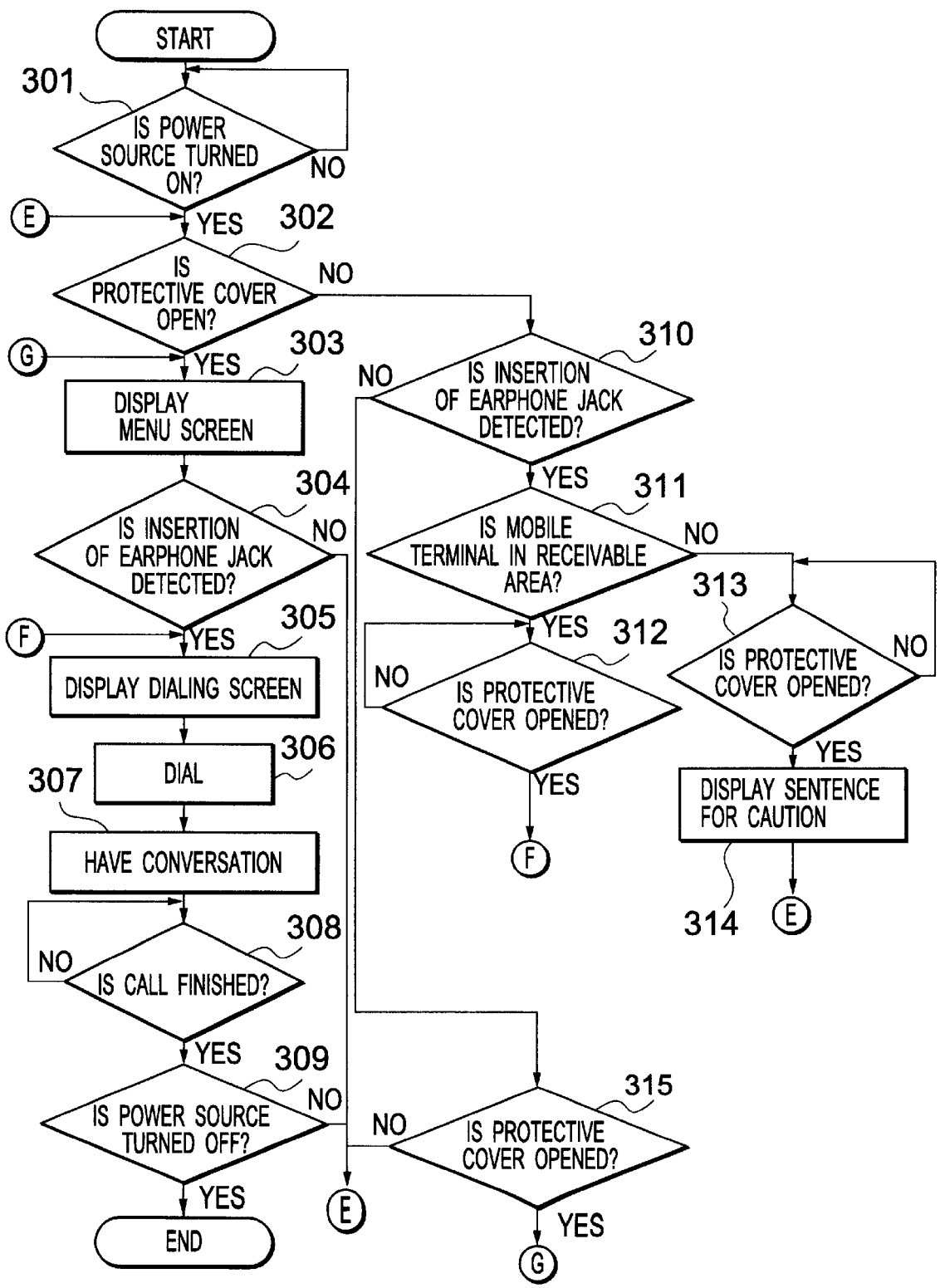
FIG. 13 is a flowchart for explaining the operation of a suitable example of the mobile terminal shown in FIG. 11.

As shown in FIG. 13, when the power source is turned on (YES in a step 301), it is judged in a step 302 whether the protective cover 13 is open or not. If it is judged (YES in the step 302) that the protective cover 13 is open, a menu screen is displayed on LCD 8 in a step 303. It is judged in a step 304 whether an earphone jack 10 is inserted into an earphone jack inserting part 9 or not. If the earphone jack 10 is not inserted into the earphone jack inserting part 9 (NO in the step 304), processing after the step 302 is executed again. On the other hand, if the earphone jack 10 is inserted into the earphone jack inserting part 9 (YES in the step 304), a dialing screen shown in FIG. 3 is displayed on LCD 8 in a step 305. When a user dials on the dialing screen displayed on LCD 8 in a step 306, the user and the other party have conversation in a step 307. When the call is finished (YES in a step 308), it is judged in a step 309 whether the power source is turned off or not and if the power source is not turned off (NO in the step 309), processing after the step 302 is executed again.

If it is judged that the protective cover 13 is closed (NO in the step 302), it is judged in a step 310 whether the earphone jack 10 is inserted in the earphone jack inserting part 9 or not. If the earphone jack 10 is not inserted into the earphone jack inserting part 9 (NO in the step 310), it is judged in a step 315 whether the protective cover 13 is opened or not. If the protective cover 13 is opened (YES in the step 315), a menu screen is displayed and processing after the step 303 is executed. On the other hand, if the earphone jack 10 is inserted into the earphone jack inserting part 9 (YES in the step 310), it is judged in a step 311 whether a mobile terminal exists in a receivable area or not. If the mobile terminal exists in a receivable area (YES in the step 311), it is judged in a step 312 whether the protective cover 13 is opened or not. If the protective cover 13 is opened (YES in the step 312), a dialing screen is displayed on LCD 8 and processing after the step 305 is executed. On the other hand, if the mobile terminal does not exist in the receivable area (NO in the step 311), it is judged in a step 313 whether the protective cover 13 is opened or not. If the protective cover 13 is opened (YES in the step 313), a sentence for caution, for example "You cannot call" is displayed on LCD 8 and processing after the step 302 is executed again.

Figure 14:
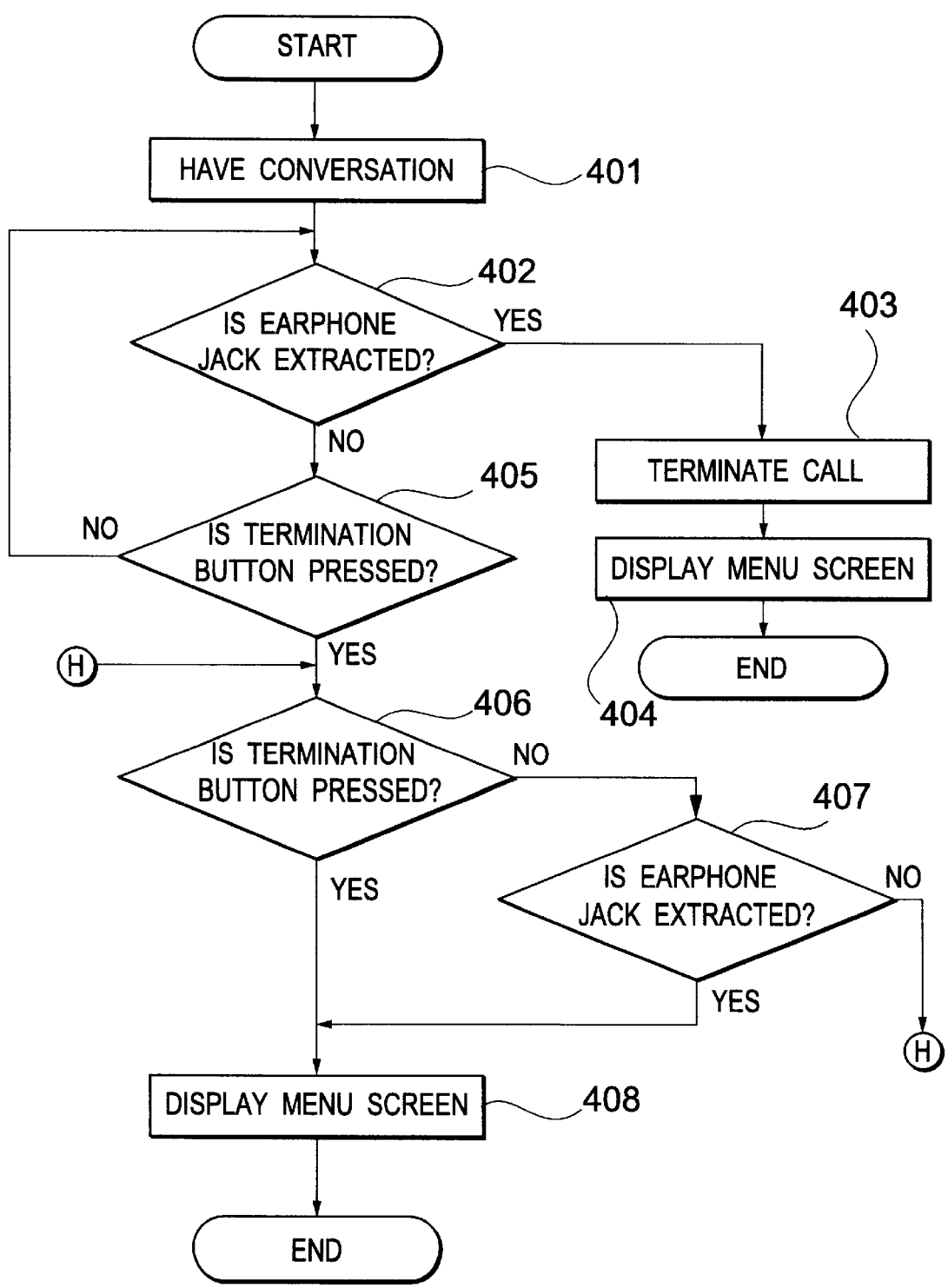
FIG. 14 is a flowchart for explaining the operation of a suitable example when an earphone jack is extracted of the mobile terminals shown in FIGS. 1 and 11.

Next, referring to FIG. 14, the operation of a suitable example of the mobile terminals shown in FIGS. 1 and 11 when the earphone jack is extracted will be described in detail.

If another function is used during a call, a screen corresponding to the function is displayed on LCD 8. If no other function is used, the dialing screen is displayed as it is.

First, during a call (a step 401), it is judged in a step 402 whether the earphone jack 10 is extracted or not. That is, it is judged whether the insertion of the earphone jack 10 is detected or not. If the earphone jack 10 is extracted during the call (YES in the step 402), call terminating operation is automatically executed in a step 403 and the screen displayed on LCD 8 is automatically switched to a menu screen in a step 404.

On the other hand, if the earphone jack 10 remains inserted during the call (NO in the step 402), it is judged in a step 405 whether a call terminating button is pressed or not. If the call terminating button is not pressed (NO in the step 405), processing in the step 402 is executed again. If the call terminating button is pressed (YES in the step 405), the call is finished and it is judged in a step 406 whether a termination button is pressed or not. If it is judged that the termination button is not pressed (NO in the step 406), it is judged in a step 407 whether the earphone jack 10 is extracted or not. If the earphone jack 10 remains inserted without pressing the termination button (NO in the step 407), processing in the step 406 is executed again.

If the call is finished and the termination button is pressed (YES in the step 406) and if the earphone jack 10 is extracted without pressing the termination button (YES in the step 407), a menu screen is displayed on LCD 8 in a step 408.

In this embodiment, for a dialing screen, a ten key screen and an address book screen are given as an example, however, the dialing screen is not limited to these screens. In short, the dialing screen has only to be a screen required in case a telephone function is used.

As described above, according to the present invention, as a dialing screen is automatically displayed by inserting the earphone jack 10 into the mobile terminal, predetermined operation for switching a menu screen to a dialing screen is not required and operability can be enhanced.

As even a user who does not know a method of operating the mobile terminal at all can use the mobile terminal as a telephone set only by inserting the earphone jack 10 into the mobile terminal, flexibility can be enhanced.

As a dialing screen is automatically displayed when the protective cover 13 is opened with the earphone jack 10 inserted in the mobile terminal, a user can operate promptly to make a call.

Further, as a call is automatically finished and a menu screen is displayed if the earphone jack is extracted from the mobile terminal, a user is not required to perform any operation for displaying the menu screen after the call is finished and can perform the next processing promptly. obviously, numerous additional modifications and variations of the present invention are possible in light of the above teachings. It is, therefore, to be understood that within the scope of the appended claims, the invention may be practiced otherwise than as specifically described herein.

What is claimed is:

1. A mobile terminal, comprising:

display means for displaying a menu screen;

detection means for detecting the insertion of an earphone jack;

control means for controlling said display means such that said menu screen is switched to a dialing screen for executing a telephone function based upon the output of said detection means; and calling means for making a call using a telephone function, wherein said display means displays said dialing screen.

2. The mobile terminal as claimed in claim 1, wherein said control means controls said display means so that said menu screen is switched to said dialing screen if the insertion of said earphone jack is detected.

3. The mobile terminal as claimed in claim 1, wherein said dialing screen comprises a ten key screen or an address book screen.

4. The mobile terminal as claimed in claim 3, further comprising:

selection means for selecting either said ten key screen or said address book screen.

5. The mobile terminal as claimed in claim 1, further comprising:

operation means for operating to execute a function except said telephone function.

6. The mobile terminal as claimed in claim 5, further comprising:

interruption means for interrupting the execution of the function except said telephone function if the insertion of said earphone jack is detected when the function except said telephone function is executed.

7. The mobile terminal as claimed in claim 6, further comprising:

resumption means for resuming the execution of the function interrupted by said interruption means after a call is finished.

8. The mobile terminal as claimed in claim 5, comprising:

judgment means for judging whether an earphone jack is extracted during a call or not.

9. The mobile terminal as claimed in claim 8, further comprising:

call terminating processing means for executing the terminating processing of said call based upon the output of said judgment means.

10. The mobile terminal as claimed in claim 8, wherein said control means controls said display means based upon the output of said judgment means.

11. The mobile terminal as claimed in claim 1, further comprising:

judgment means for judging whether a protective cover for protecting said display means is open or not.

12. The mobile terminal as claimed in claim 11, further comprising:

judgment means for judging whether an earphone jack is extracted during a call or not.

13. The mobile terminal as claimed in claim 12, further comprising:

call terminating processing means for executing the terminating processing of said call based upon the output of said judgment means.

14. The mobile terminal as claimed in claim 12, wherein said control means controls said display means based upon the output of said judgment means.

15. The mobile terminal as claimed in claim 11, wherein said control means controls said display means based upon the output of said detection means and said judgment means.

16. The mobile terminal as claimed in claim 15, wherein said display means displays said dialing screen if said protective cover is opened with said earphone jack inserted.

17. The mobile terminal as claimed in claim 15, further comprising:

judgment means for judging whether the mobile terminal exists in a receivable area or not if said earphone jack is inserted with said protective cover closed.

18. The mobile terminal as claimed in claim 17, wherein said display means displays a predetermined warning message if it is judged by said judgment means that the mobile terminal does not exist in a receivable area.

19. A mobile terminal, comprising:

display means for displaying a menu screen;

detection means for detecting the insertion of an earphone jack;

control means for switching said menu screen to a dialing screen for executing a telephone function based upon the output of said detection means; and judgment means for judging whether the mobile terminal exists in a receivable area or not, wherein said display means displays a predetermined warning message if the insertion of said earphone jack is detected in a state in which it is judged that the mobile terminal does not exist in a receivable area.

20. A mobile terminal, comprising:

display means for displaying a menu screen;

detection means for detecting the insertion of an earphone jack;

control means for switching said menu screen to a dialing screen for executing a telephone function based upon the output of said detection means;

a cell for driving said mobile terminal; and comparison means for comparing the voltage value of said cell with a predetermined value, wherein said display means displays a predetermined warning message if the insertion of said earphone jack is detected in a state in which the voltage value of said cell is a predetermined value or smaller.

21. A mobile terminal, comprising:

a liquid crystal display (LCD) for displaying a menu screen;

an earphone jack insertion detecting section for detecting the insertion of an earphone jack; and a central processing unit (CPU) for controlling said LCD such that said menu screen display on said LCD is switched to a dialing screen for executing a telephone function based upon the output of said detecting section.

22. The mobile terminal as claimed in claim 21, further comprising:

a protective cover opening/closing detecting section for judging whether a protective cover for protecting said LCD is open or not.

23. A method of controlling a display of a mobile terminal, comprising:

turning on a power source;

displaying a menu screen on a display;

detecting the insertion of an earphone jack; and controlling said display such that said menu screen is switched to a dialing screen for executing a telephone function based upon detection of said insertion.

24. The method of controlling the display of a mobile terminal as claimed in claim 23, further comprising:

judging whether the mobile terminal exists in a receivable area or not;

displaying information showing whether the mobile terminal exists in the receivable area or not; and displaying a predetermined warning message if an earphone jack is inserted with the mobile terminal existing outside the receivable area.

25. The method of controlling the display of a mobile terminal as claimed in claim 23, further comprising:

comparing the voltage value of an included cell with a predetermined value; and displaying a predetermined warning message if the voltage value of said cell is said predetermined value or smaller.

26. The method of controlling the display of a mobile as claimed in claim 23, further comprising:

dialing; and having conversation.

27. The method of controlling the display of a mobile terminal as claimed in claim 26, further comprising:

operating to execute another function different from said telephone function;

executing the function based upon said operation; and interrupting the execution of said function if said earphone jack is inserted while the function based upon said operation is executed.

28. The method of controlling the display of a mobile terminal as claimed in claim 27, further comprising:

resuming the execution of said function interrupted when said call is finished.

29. The method of controlling the display of a mobile terminal as claimed in claim 26, further comprising:

detecting the extraction of said earphone jack; and terminating said call based upon detection of said extraction of said earphone jack.

30. The method of controlling the display of a mobile as claimed in claim 23, further comprising:

judging whether a protective cover is open or not; and displaying a dialing screen when said protective cover is opened if said earphone jack is inserted with said protective cover closed.

31. The method of controlling the display of a mobile terminal as claimed in claim 30, further comprising:

judging whether the mobile terminal exists in a receivable area or not; and displaying a predetermined warning message when said protective cover is opened while the mobile terminal does not exist in a receivable area.

32. The method of controlling the display of a mobile terminal as claimed in claim 23, further comprising:

detecting the extraction of said earphone jack; and switching said dialing screen to said menu screen based upon detection of said extraction of said earphone jack.

* * * * *